(12) United States Patent
Takeda

(10) Patent No.: US 6,643,241 B2
(45) Date of Patent: Nov. 4, 2003

(54) OPTICAL DISK REPRODUCING APPARATUS

(75) Inventor: Kunio Takeda, Kanagawa-Ken (JP)

(73) Assignee: Koninklijke Philips Electronics N.V., Eindhoven (NL)

( * ) Notice: Subject to any disclaimer, the term of this patent is extended or adjusted under 35 U.S.C. 154(b) by 101 days.

(21) Appl. No.: 09/775,845

(22) Filed: Feb. 2, 2001

(65) Prior Publication Data

US 2001/0019526 A1 Sep. 6, 2001

(30) Foreign Application Priority Data

Feb. 2, 2000 (JP) .................................... 2000-024584

(51) Int. Cl.$^7$ ............................................. G11B 33/02
(52) U.S. Cl. .................. 369/77.1; 369/75.2; 369/30.32
(58) Field of Search ............................. 369/75.2, 77.1, 369/77.2, 30.32

(56) References Cited

U.S. PATENT DOCUMENTS 4,445,087 A * 4/1984 Mehnert ..................... 324/175
6,005,833 A * 12/1999 Yasuma et al. ............. 369/75.2

FOREIGN PATENT DOCUMENTS

GB 1489302 10/1977 ............ G05B/11/10
GB 2302983 A 2/1997 ............ G11B/17/04

* cited by examiner

*Primary Examiner*—William Korzuch
*Assistant Examiner*—Mark Blouin
(74) *Attorney, Agent, or Firm*—Michael E. Belk

(57) ABSTRACT

In an optical disk reproducing apparatus 1 in which a mounting tray slides to a projected position and a contained position with respect to the apparatus main body, to slide the mounting tray at a series of continuous predetermined speeds independent of change in environmental conditions.

A series of continuous application voltages, to be supplied from a drive source 8 to an output motor 16 so as to slide a mounting tray 3 at a series of continuous speeds, for use in an use environment of the highest frequency of use where the mounting tray 3 slides at a series of continuous speeds, are preset-stored in computation means 21. When the mounting tray 3 is actually slided by an output from the output motor 16, if the preset speeds are not attained, the computation means 21 outputs a command signal to the drive source 8 to appropriately correct the application voltages to the output motor 16.

10 Claims, 4 Drawing Sheets

OPTICAL DISK REPRODUCING APPARATUS

BACKGROUND OF THE INVENTION

1. Technical Field

The present invention relates to an optical disk reproducing apparatus which slides a mounting tray for placing an optical disk so as to take a projected position for placement and discharge of the optical disk and a contained position for optical disk reproduction relative to an apparatus main body, and more particularly to control of speed when starting the mounting tray sliding relative to the apparatus main body.

2. Related Art

In an optical disk reproducing apparatus which slides a mounting tray for placing an optical disk so as to take a projected position and a contained position relative to an apparatus main body, when sliding the mounting tray relative to the apparatus main body, up to now a preset application voltage is supplied to an output motor from a drive source and such an application voltage makes the output motor of a drive means output a rotational force and as a result this rotational force drives the mounting tray to slide.

A load imposed when attempting to start a mounting tray sliding is larger in comparison with a load imposed when the mounting tray is sliding.

And it is known that a load imposed when a mounting tray slides, particularly a load imposed when it starts sliding varies greatly according to such an environmental condition as temperature, humidity and the like of a space where the apparatus is used.

On the other hand, since an optical disk reproducing apparatus which slides a mounting tray of an optical disk so as to take a projected position and a contained position relative to an apparatus main body needs to start and stop sliding as keeping a state where the optical disk on the mounting tray is stable without being slipped off in position, it is desirable to slide the mounting tray at a comparatively low speed relative to the apparatus main body immediately before the start and stop of sliding the mounting tray.

In this case, when sliding the mounting tray at a low speed immediately before the start and stop of sliding, a problem occurs that the total time required for sliding of the mounting tray becomes too long. Thereupon, in order to solve this problem, it is necessary to slide the mounting tray at a low speed for a certain period after the start and for a certain period before the stop of sliding and slide the mounting tray at a comparatively high speed in the middle course.

In a conventional optical disk reproducing apparatus having such a composition, however, in case that a mounting tray slides at a speed as not specified relative to an apparatus main body due to variation of an environmental condition where the apparatus is used, there has been a problem that the total time required for the mounting tray to slide is unstable without being fixed.

Particularly, a load imposed when a mounting tray starts sliding varies greatly according to an environmental condition in which it is used.

However, since it is necessary to surely slide the mounting tray relative to the apparatus main body under any environmental condition, a conventional optical disk reproducing apparatus has supplied a high initial application voltage corresponding to the maximum load expected at the start of sliding to an output motor.

Due to this, there has been a problem that since the output motor supplied with a high initial application voltage outputs a large driving force to the mounting tray and the mounting tray starts sliding due to receiving such a large driving force, it has been impossible in practice to control a sliding speed of the mounting tray so that the sliding speed is made slow at the start of sliding, fast in the middle course and slow again immediately before the stop of sliding.

The present invention has been performed in consideration of the above-mentioned circumstances, and provides an optical disk reproducing apparatus which can slide a mounting tray of an optical disk at a series of continuous speeds as desired relative to an apparatus main body when the mounting tray slides so as to take a projected position and a contained position relative to the apparatus main body, and in which the total time required for sliding is nearly constant and stable.

SUMMARY OF THE INVENTION

The present invention is an optical disk reproducing apparatus which controls a driving force of a drive means for driving a mounting tray so that a continuous speed of sliding of the mounting tray relative to the apparatus main body obtains a previously set and stored value when the mounting tray slides relative to the apparatus main body.

A detailed composition of the present invention is an optical disk reproducing apparatus comprising:

an apparatus main body including pickup means for picking up recorded information from an optical disk; a mounting tray on which the optical disk is mounted; and slide means for sliding the mounting tray to a projected position for placement and discharge of the optical disk and a contained position for optical disk reproduction with respect to said apparatus main body, wherein said slide means has: an output motor and a drive source for supplying an application voltage to the output motor; drive means for supplying a driving force to said mounting tray to slide said tray with respect to said apparatus main body, and control means for previously storing a series of preset continuous speeds of slide with respect to said apparatus main body from slide start to slide stop upon slide of said mounting tray, and previously storing a series of preset continuous application voltages to be supplied from the drive source of said drive means to the output motor so as to obtain the preset-stored series of continuous speeds of slide, further, when said drive source supplies the preset-stored continuous application voltages to the output motor, to cause said drive means to output the driving force, so as to actually slide said mounting tray with respect to said apparatus main body, if said tray cannot slide at said preset continuous speeds, for controlling the application voltages from said drive source to said output motor so as to obtain the preset series of continuous speeds.

In an optical disk reproducing apparatus having the above-mentioned composition, measurement means for measuring a slide speed of said mounting tray with respect to said apparatus main body includes a timer, a rotating body having stripes extending in radial directions which is turned by a rotational force of the output motor of the drive means, and an optical sensor which detects rotation of the stripes of the rotating body as a change in optical brightness/darkness.

In an optical disk reproducing apparatus having such a composition, a control means compares a sliding speed of the mounting tray with a preset speed and, in case that the mounting tray slides at a speed different from the preset speed, controls the driving force output of a drive means.

And in an optical disk reproducing apparatus having such a composition, when a mounting tray slides a rotating body turns and an optical sensor detects rotation of the stripes of the rotating body as a change in optical brightness/darkness and a measurement means measures the sliding speed of the mounting tray on the basis of variation in brightness per unit time by a timer.

BRIEF DESCRIPTION OF THE DRAWINGS

An embodiment of the present invention is described with reference to the drawings in the following. However, the present invention is not limited to this embodiment. In the drawings.

Figure 1:
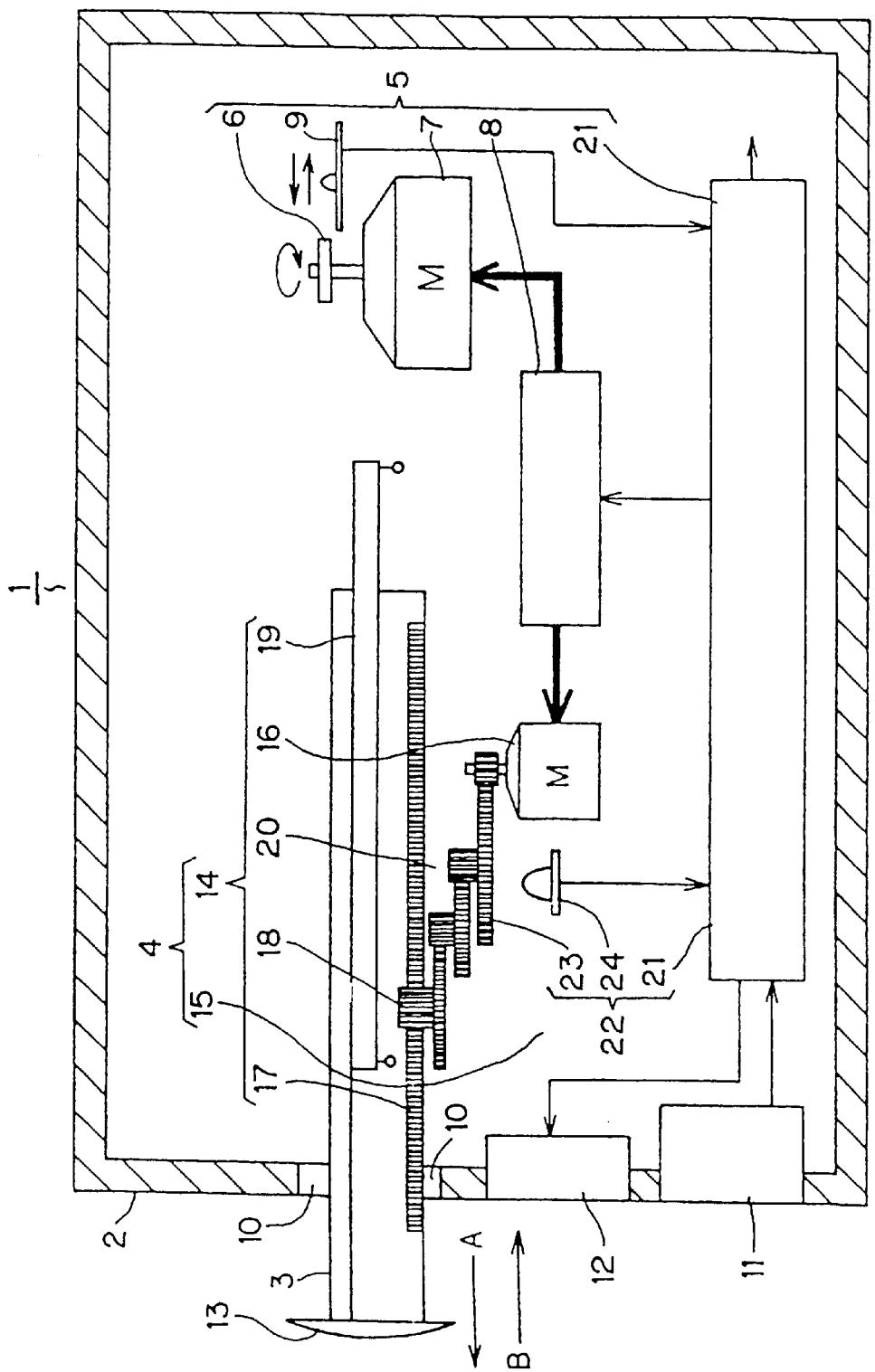
FIG. 1 is a composition explaining figure for explaining the composition of an embodiment of the present invention.

The optical disk reproducing apparatus and its main parts are indicated by the following reference numerals.

1: Optical disk reproducing apparatus
2: Apparatus main body
3: Mounting tray
4: Slide means
5: Pickup means
8: Drive source
10: Opening
14: Drive means
15: Control means
16: Output motor
21: Computing means
22: Measurement means
23: Rotating body
24: Optical sensor

DETAILED DESCRIPTION OF THE INVENTION

FIG. 1 shows an optical disk reproducing apparatus according to the invention 1 comprises an apparatus main body 2, a mounting tray 3 and a slide means 4, as shown in FIG. 1.

The apparatus main body 2 is nearly box-shaped, in which a pickup means 5 for optically picking up recorded information from an optical disk is provided.

The pickup means 5 is composed of a turntable 6 for having an optical disk mounted on it, an output motor 7 for rotationally driving the turntable 6, a drive source 8 for supplying an application voltage for making the output motor 7 output, and an information reading means 9 for reproducing an optical disk mounted on the turntable 6, namely, for optically reading recorded information from the optical disk.

The apparatus main body 2 has an opening 10 for drawing in and out the mounting tray 3 provided in its front face and further has an operation part 11 and a display panel 12 provided. The display panel 12 displays the on state of the main power source, information related to an optical disk under reproduction and the like.

And the opening 10 is shut up by a lid 13 provided on the front part of the mounting tray 3 when the mounting tray 3 is contained in the apparatus main body 2.

The slide means 4 is used for sliding the mounting tray 3 relative to the apparatus main body 2 so that the mounting tray 3 takes a projected position for placement and discharge of an optical disk relative to the apparatus main body 2 and a contained position for reproducing the optical disk relative to the apparatus main body 2.

The slide means 4 is mainly composed of a drive means 14 and a control means 15.

The drive means 14 is used for sliding the mounting tray 3 so that it takes the contained position and the projected position relative to the apparatus main body 2.

The drive means 14 is composed mainly of an output motor 16, a drive source 8 for supplying an application voltage to the output motor 16, a rack gear 17 provided on the bottom face of the mounting tray 3, a pinion gear 18 engaging with the rack gear 17, a guide member 19 for guiding the mounting tray 3 in its sliding directions (the directions of arrows A and B), and a gear train 20 disposed between the output motor 16 and the pinion gear 18.

Limiters (not illustrated) for stopping the mounting tray 3 sliding in cooperation with the mounting tray 3 sliding are provided respectively at the front and rear ends of the guide member 19.

The control means 15 is provided with a computing means 21 having a memory (not illustrated) and controls the driving output of the drive means 14.

The memory of the computing means 21 has a series of continuous speeds of sliding of the mounting tray 3 relative to the apparatus main body 2 when sliding the mounting tray 3 from the contained position to the projected position by making the drive means 14 output or when sliding the mounting tray 3 from the projected position to the contained position, namely, a series of continuous speeds when a specific part of the mounting tray 3 passes (displaces) the respective parts (opening 10, for example) set and stored in advance in it.

Figure 2:
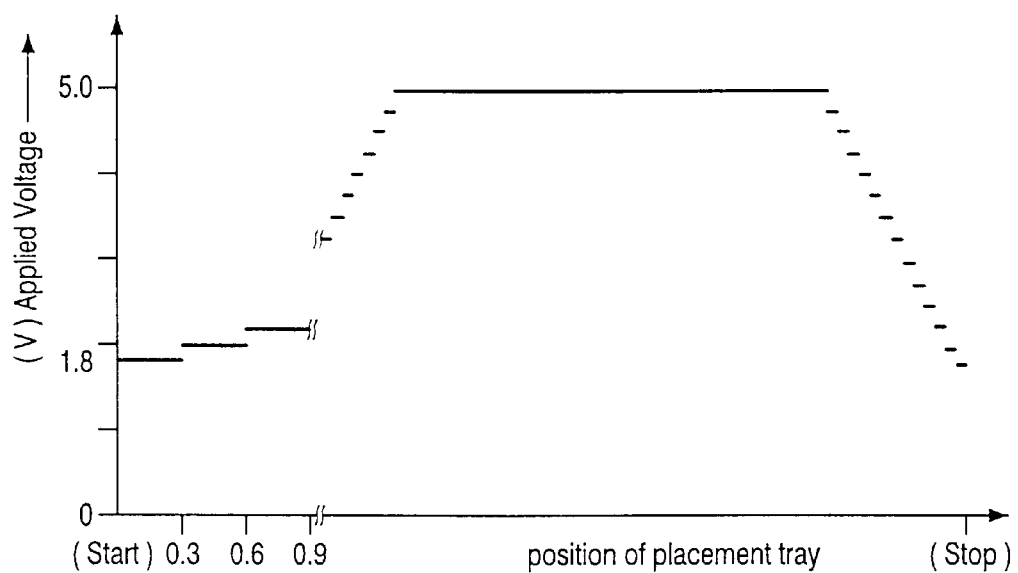
FIG. 2 is a characteristic explaining diagram for explaining the relation between displacements and a series of continuous speeds of sliding of a mounting tray relative to an apparatus main body which are set and stored in advance in a memory of a computing means when sliding the mounting tray so that the mounting tray takes a projected position from a contained position or takes the contained position from the projected position relative to the apparatus main body by operating a drive means, in the embodiment shown in FIG. 1.

A sliding speed of the mounting tray 3, namely, a series of continuous speeds of the mounting tray 3 relative to the apparatus main body 2 when the mounting tray 3 slides from the contained position to the projected position relative to the apparatus main body 2 are as shown in FIG. 2.

In the same way, a series of continuous speeds of the mounting tray 3 relative to the apparatus main body 2 when the mounting tray 3 slides from the projected position to the contained position relative to the apparatus main body 2 are also as shown in FIG. 2.

The magnitude of a driving force of the drive means 14, namely, a series of continuous application voltages to be supplied to the output motor 16 by the drive source 8 are set and stored in advance in the memory of the computing means 21 so that the mounting tray 3 obtains said preset-stored series of continuous speeds when the mounting tray 3 slides relative to the apparatus main body 2 under a certain condition.

A certain condition in this case means an environmental condition under which an optical disk reproducing apparatus 1 is ordinarily most frequently used.

In other words, application voltages to be supplied by the drive source 8 to the output motor 16 correspondingly to a preset-stored series of continuous speeds of the mounting tray 3 to slide relative to the apparatus main body 2 in an environmental condition under which the apparatus is ordinarily most frequently used are set and stored in advance in the memory of the computing means 21.

Further, the control means 15 is provided with a function which controls the application voltage to the output motor 16 from the drive source 8 so that the mounting tray 3 can obtain said preset-stored speed in case that the mounting tray 3 cannot obtain said preset-stored speed relative to each part of the apparatus main body 2 when the mounting tray 3 is actually slided relative to the apparatus main body 2 by the preset-stored application voltage supplied by the drive source 8 to the output motor 8.

The control means 15 is provided with a measurement means 22 for measuring a series of continuous speeds of the mounting tray 3 sliding with respect to the respective positions in the apparatus body 2.

The measurement means 22 is composed mainly of a rotating body 23 which is turned by a rotational force from the output motor 16 and has a striped pattern extending in radial directions, an optical sensor 24 for optically detecting variation in brightness caused by rotation of the rotating body 23, and a computing means 21 which has a timer (not illustrated) built in it having a clocking function for clocking from the start of sliding of the mounting tray 3, namely, the start of rotation of the rotating body 23, measures rotation of the rotating body 23 on the basis of a signal from the optical sensor 24 and computes the speed of the mounting tray 3 relative to the apparatus body 2 on the basis of a value obtained by the measurement and the clocking function of said timer.

The rotating body 23 is attached coaxially to one gear in the gear train 20.

The gear train 20 operates between the start and stop of sliding of the mounting tray 3 slided by the driving force outputted from the drive means 14, and in the measuring means 22, the optical sensor 24 detects rotation of the rotating body 23 turning together with operation of this gear train 20 as a change in brightness, the computing means 21 finds the number of rotations per unit time of the rotating body 23 on the basis of a signal from the optical sensor 24 and a time counted by said timer, and as a result the speed of sliding (displacing) of the mounting tray 3 is measured.

And in order to start the mounting tray 3 sliding as keeping an optical disk stably placed on the mounting tray 3 without being slipped off in position, it is necessary to start the mounting tray 3 sliding at a low speed with a small inertia.

In order to secure this, an initial application voltage (1.8 V) to be supplied to the output motor 16 from the drive source 8 of the drive means 14 is set and stored in advance in the memory of the control means 15 so that the mounting tray 3 starts sliding at a low speed.

An initial application voltage in this case means the minimum voltage or a voltage slightly lower than the minimum voltage most frequently supplied out of application voltages supplied to the output motor 16 from the drive source 8 when starting the mounting tray 3 sliding under an ordinary condition or a certain condition described above under which an optical disk reproducing apparatus 1 is used.

The optical disk reproducing apparatus 1 is composed as described above. Operation of the optical disk reproducing apparatus 1 is described with reference to a flowchart shown in FIG. 4 in the following.

A user turns on the main power source by operating the operation part 11.

Further, in order to place a desired optical disk on the mounting tray 3, the user operates the operation part 11 to make the slide means 4 output so that the mounting tray 3 comes to the projected position from the contained position relative to the apparatus main body 2.

Hereupon, the computing means 21 outputs a signal for making the drive means 14 drive and slide the mounting tray 3 on the basis of a signal from the operation part 11.

Namely, the computing means 21 outputs to the drive source 8 a signal for supplying the output motor 16 with an initial application voltage of 1.8 V.

When the drive source 8 supplies the output motor 16 with an initial application voltage of 1.8 V, the output motor 16 attempts to output rotation when receiving the initial application voltage of 1.8 V supplied from the drive source 8.

After a time interval of e.g. 0.3 s, it is tested whether the mounting tray 3 starts sliding.

Hereupon, in case that the rotation output transferred from the output motor 16 to the pinion gear 18 through the gear train 20 is larger than a load imposed when the mounting tray 3 starts sliding, the rotation output from the pinion gear 18 starts the mounting tray 3 sliding in the direction of arrow A through the rack gear 17.

At this time, in the measurement means 22 the rotating body 23 is turning together with a gear being coaxial with it in the gear train 20 receiving the rotation output from the output motor 16 of the drive means 14, and the optical sensor 24 optically senses a change in brightness of a striped pattern caused by rotation of the rotating body 23 and sends this fact to the computing means 21 by means of a signal.

Hereupon, the computing means 21 judges that the mounting tray 3 has started sliding and continues sliding.

On the other hand, in case that a load imposed when the mounting tray 3 starts sliding is larger than the rotation output transferred from the output motor 16 to the pinion gear 18 through the gear train 20, a state where the mounting tray 3 keeps a stop state and does not start sliding results in continuing.

At this time, the measurement means 22 sends to the computing means 21 by means of a signal a fact that the rotating body 23 is kept as stopped in rotation and the optical sensor 24 does not sense variation in brightness to be caused by the striped pattern of the rotating body 23.

Hereupon, at a point of time when a state where the mounting tray 3 is at a stop and does not start sliding is kept and said built-in timer counts that a preset time of 0.3 second has elapsed after a signal instructing output of the initial application voltage was issued to the drive source 8, the computing means 21 outputs to the drive source 8 an instruction signal which instructs the drive source 8 to apply to the output motor 16 a voltage of 2.0 V being higher by 0.2 V than the initial application voltage of 1.8 V.

Even though the drive source 8 applies a voltage of 2.0 V being higher by 0.2 V than the initial application voltage of 1.8 V to the output motor 16, a state where the mounting tray 3 is at a stop state and does not start sliding continues, and when the measurement means 22 notifies the computing means 21 of this fact by means of a signal and said built-in timer counts that further a time of 0.3 second has passed, the computing means 21 outputs to the drive source 8 an instruction signal which instructs the drive source 8 to apply to the output motor 8 a voltage of 2.2 V being higher by 0.2 V than the applied voltage.

In such a way, until the mounting tray 3 starts sliding, the computing means 21 sends an output instruction signal to the drive source 8 so as to apply a voltage further higher by 0.2 V to the output motor 16 of the drive means 14 each time a time of 0.3 second has passed.

Hereupon, when the output motor 16 is supplied with voltages being higher in stages from the drive source 8 and as a result when the rotation output of the output motor 16 becomes larger than a load imposed on the mounting tray 3, the mounting tray 3 starts sliding.

It is tested whether the sliding speed of the mounting tray 3 corresponds to a desired speed being set and stored in advance in the memory of the computing means 21.

When the mounting tray 3 starts sliding, the control means 15 controls output of the drive means 14 so that the mounting tray 3 slides at a series of continuous speeds from the start to the end of sliding relative to the apparatus main body 2, said speeds being set and stored in advance in the memory of the computing means 21.

Namely, in the control means 15, the computing means 21 outputs to the drive source 8 an instruction signal for supplying to the output motor 16 of the drive means 14 a series of continuous application voltages set and stored in advance in the memory of the computing means 21 correspondingly to sliding the mounting tray 3 at said series of continuous speeds.

Figure 3:
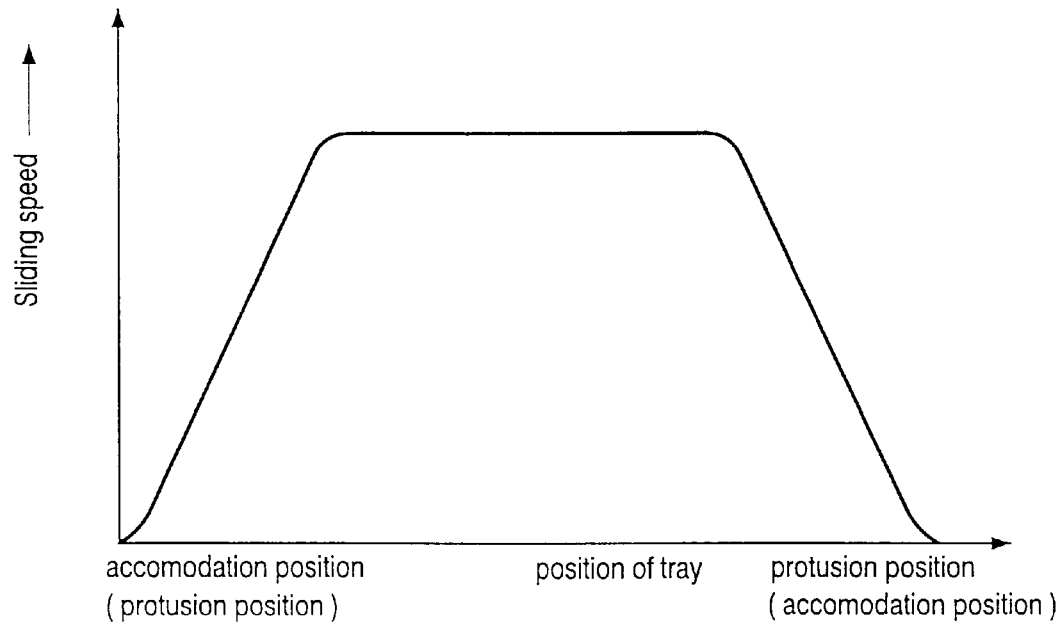
FIG. 3 is a characteristic explaining diagram for explaining the relation between displacements of the mounting tray and a series of continuous application voltages to be supplied by a drive source to an output motor which voltages are set and stored in advance in the memory of the computing means so that the mounting tray slides at a speed having characteristics shown in FIG. 2 when sliding the mounting tray so that the mounting tray takes the contained position from the projected position or takes the contained position from the projected position relative to the apparatus main body when the apparatus is used under a certain condition being an environmental condition under which the apparatus is ordinarily most frequently used, in the embodiment shown in FIG. 1.

More concretely, in the control means 15, the computing means 21 outputs to the drive source 8 an instruction signal for supplying the output motor 16 of the drive means 14 with a series of continuous application voltages shown in FIG. 3.

On the other hand, when the mounting tray 3 is sliding, in the control means 15 the measurement means 22 detects variation in brightness caused by rotation of the striped pattern of the rotating body 23 by means of the optical sensor 24 and sends this fact to the computing means 21 by means of a signal and the computing means 21 computes the number of rotations per unit time on the basis of the sent signal and a time measured by said timer and, from the result of computation, computes a displacement position of the mounting tray 3 relative to the apparatus main body 2 and a sliding speed at the displacement position.

And the control means 15 judges whether or not a sliding speed of the mounting tray 3 sliding relative to the apparatus main body 2 at a displacement position is equal to the speed set and stored in advance in said memory.

In short, the control means 15 judges whether or not the mounting tray 3 is sliding at a previously set and stored speed at each position (displacement) of the mounting tray 3 computed by the measuring means 22.

More concretely, when the mounting tray 3 is sliding relative to the apparatus main body 2, the gear train 20 operates and the rotating body 23 turns, and the optical sensor 24 detects and sends rotation of the rotating body 23 as variation in brightness to the computing means 21.

The computing means 21 computes the quantity of displacement (distance) from the start of sliding by counting the number of bright and dark stripes detected by the optical sensor 24, and computes the sliding speed of the mounting tray 3 from the number of bright and dark stripes per unit time detected by the optical sensor 24 at the point of time on the basis of clocking of the built-in timer.

Hereupon, in case that the computing means 21 judges that a sliding speed at a displacement of the mounting tray 3 being sliding is equal to a previously set and stored speed, it outputs to the drive source 8 an instruction signal for supplying the previously set and stored series of continuous application voltages to the output motor 16 as they are.

On the other hand, in case that the computing means 21 judges that a sliding speed at a displacement of the mounting tray 3 being sliding is not equal to a previously set and stored speed, it outputs to the drive source 8 an instruction signal for supplying a correcting application voltage corresponding to that speed so as to obtain a preset-stored series of continuous speeds of sliding.

Hereupon, the output motor 16 is supplied with such a corresponding application voltage from the drive source 8 and drives the mounting tray 3 against a load, and the mounting tray 3 slides so as to obtain the preset-stored series of continuous speeds of sliding.

When the mounting tray 3 continues sliding and arrives at a specified distance before the stop position, namely, the most projected position relative to the apparatus main body 2, or in short, when a distance (displacement) from the start position of sliding becomes a specified value, in order to decelerate a sliding speed set and stored in the memory the computing means 21 sends to the drive source 8 an instruction signal to give an application voltage set and stored corresponding to such a deceleration to the output motor 16.

Therefore, the computing means 21 outputs an instruction signal for supplying application voltages gradually lowered to the drive source 8.

Hereupon, the mounting tray 3 lowers its sliding speed in response to the gradually lowered voltages applied to the output motor 16, and further operates in cooperation with said limiter attached to the guide member 19 and, as a result, stops at the most projected position relative to the apparatus main body 2.

The user can place a desired optical disk on the mounting tray 3 being in such a projected state.

In the optical disk reproducing apparatus 1, since the sliding speed of the mounting tray 3 relative to the apparatus body 2 is controlled as described above, even when a load imposed on the mounting tray 3 is changed by the influence of an environmental condition such as temperature, humidity and the like in a space where the optical disk reproducing apparatus 1 is used, output of the output motor 16 to the mounting tray 3 changes in response to the change and as a result, it is possible to slide the mounting tray 3 at a series of continuous speeds as desired relative to the apparatus main body 2.

Particularly, in the optical disk reproducing apparatus 1, the mounting tray 3 can start sliding at a low speed and a problem that it is kept in a stop state or starts abruptly sliding does not occur.

And since the mounting tray 3 slides at a sliding speed set and stored in advance or at a sliding speed corrected so as to approach the previously set and stored speed, the total time required for sliding is nearly constant and stable and, it is possible to secure the sliding time of the mounting tray 3 as desired.

Additionally, in case that an optical disk is placed on the mounting tray 3, since when the mounting tray 3 arrives at a certain distance before the projected stop position the sliding speed of it is decelerated in steps and stopped, the mounting tray 3 does not receive a great shock when stopping and the optical disk placed on the mounting tray 3 does not receive a large inertia and is not slipped off in position like when it starts sliding, and such a problem as damaging the optical disk or the mounting tray 3 does not occur.

Hereupon, the user places a desired optical disk on the mounting tray 3 and then operates the operation part 11 so as to reproduce the optical disk.

The operation of the optical disk reproducing apparatus is further described with reference to FIG. 5.

Hereupon, the computing means 21 outputs to the drive source 8 an instruction signal for supplying an initial application voltage of 1.8 V to the driving motor 16.

The control means 15 controls application voltages to the output motor 16 from the drive source 8 in the same way as when the mounting tray 3 slides from the contained position to the projected position relative to the apparatus main body 2.

In short, the computing means 21 outputs a signal for supplying an initial application voltage of 1.8 V to the drive source 8 of the drive means 14 on the basis of a signal inputted from the operation part 11.

On receiving an initial application voltage of 1.8 V supplied from the drive source 8, the output motor 16 attempts to output rotation and in case that a rotation output transferred from the output motor 16 to the pinion gear 18 through the gear train 20 is larger than a load imposed when the mounting tray 3 starts sliding, the rotation output from the pinion gear 18 starts the mounting tray 3 sliding in the direction of arrow B through the rack gear 17.

After a waiting time it is tested whether the mounting tray 3 has started moving.

At this time, in the measurement means 22 the rotating body 23 is turned by receiving the rotation output from the output motor 16 of the drive means 14, and the optical sensor 24 optically senses the rotation of the rotating body 23 and sends a fact that the rotating body 23 is turning to the computing means 21 by means of a signal.

Hereupon, the computing means 21 judges that the mounting tray 3 has started sliding and continues further sliding.

On the other hand, in case that a load imposed when the mounting tray 3 starts sliding is larger than a rotation output from the output motor 16, a state where the mounting tray 3 is at a stop and does not start sliding continues.

At this time, the optical sensor 24 of the measurement means 22 sends to the computing means 21 by means of a signal a fact that variation in brightness to be caused by the striped pattern of the rotating body 23 does not occur.

Hereupon, when a state where the mounting tray 3 is at a stop and does not start sliding is kept, the computing means 21 outputs to the drive source 8 an instruction signal which instructs the drive source 8 to apply to the output motor 16 a voltage being higher by 0.2 V each time when it is determined that a time of 0.3 second passes and when it is detected that the mounting tray has not yet moved.

As a result, the mounting tray 3 starts sliding from the projected position to the contained position relative to the apparatus main body 2.

Since the mounting tray 3 drives the gear train 20 with a rotation output slightly larger than a load imposed on the mounting tray 3 at the start of sliding, the mounting tray 3 starts sliding at a very low speed and therefore an optical disk keeps stably a state where it is placed on the mounting tray 3 without receiving a large inertia force caused by sliding and is not slipped off in position.

When the mounting tray 3 starts sliding, in the same way as when the mounting tray 3 slides from the contained position to the projected position relative to the apparatus main body 2, the computing means 21 outputs an instruction signal to the drive source 8 so that a series of continuous application voltages set and stored in advance in the memory are supplied to the output motor 16 (see FIG. 2).

And when the mounting tray 3 starts sliding, the measurement means 22 measures a series of continuous speeds of the mounting tray 3 being sliding relative to the respective positions in the apparatus main body 2.

Hereupon, in case that the output motor 16 receives an application voltage corresponding to a displacement of the mounting tray 3 from the drive source 8 and an optical disk reproducing apparatus 1 is used under a certain condition being an environmental condition under which the optical disk reproducing apparatus 1 is ordinarily most frequently used, loads imposed on the mounting tray 3 being sliding correspond to said preset-stored application voltages and thereby the mounting tray 3 continues sliding at a speed as specified relative to each part of the apparatus main body 2.

On the other hand, in case that an environment in which the optical disk reproducing apparatus 1 is used is different from a certain condition being an environmental condition under which the optical disk reproducing apparatus 1 is ordinarily most frequently used, loads imposed on the mounting tray 3 being sliding are different from the magnitudes of loads when application voltages were originally set and stored and as a result the mounting tray 3 cannot surely slide at a sliding speed previously set and stored corresponding to a distance (displacement) from the start.

However, the slide means 4 operates in the same way as when the mounting tray 3 slides said contained position to the projected position and operates so that the control means 15 controls output of the drive means 14 so that the mounting tray 3 slides at a previously set and stored speed corresponding to a distance from the start.

In a word, in the control means 15, the computing means 21 outputs to the drive source 8 an instruction signal for supplying the output motor 16 with a correcting application voltage for obtaining a sliding speed set and stored in advance in the memory on the basis of a sliding speed of the mounting tray 3 measured by the measurement means 22.

Hereupon, the output motor 16 is supplied with an application voltage corresponding to a set and stored speed by the drive source 8 and outputs rotation to the gear train 20 and as a result the mounting tray 3 slides at a speed as specified.

The mounting tray 3 slides gradually faster from slow and starts decelerating at a certain distance before the contained position being the stop position relative to the apparatus main body 2 to slide slow.

Therefore, also when the mounting tray 3 stops sliding, an optical disk keeps stably a state where it is placed on the mounting tray 3 without receiving a large inertia force caused by sliding and is not slipped off in position. Since the optical disk is placed in a stable state at a specified position on the mounting tray 3, when the mounting tray 3 is stored into the apparatus main body 2 and arrives at a specified position, the optical disk is mounted on the turntable 6 of the pickup means 5 as specified.

Hereupon, in the optical disk reproducing apparatus 1, the pickup means 5 starts operating. In other words, the computing means 21 applies an instruction signal to apply a voltage to the drive source 8 so that the output motor 7 outputs rotation to turn the turntable 6.

The output motor 7 outputs rotation to turn the turntable 6, and the information reading means 9 picks up and sends recorded information from the optical disk to computing means 21.

The computing means 21 performs a specified process on the information signal from the information reading means 9 and then outputs it as a reproduced signal.

When the information reading means 9 finishes reading recorded information from the optical disk, it notifies the computing means 21 of this fact by means of a signal.

The computing means 21 receives such a signal and outputs to the drive source an instruction signal for stopping application of a voltage to the output motor 7 and the optical disk reproducing apparatus 1 ends reproduction of information, namely, performance of the optical disk on the mounting tray 3.

In the optical disk reproducing apparatus 1, the initial application voltage from the drive source 8 to the output motor 16 of the drive means 14 is 1.8 V and a voltage to be added in case that the mounting tray 3 does not starts sliding is 0.2 V, but it is desirable that an initial application voltage to the output motor 16 and a voltage to be added are properly selected on the basis of a load of the gear train 20, the rack gear 17 and the pinion gear 18, and the magnitude of rotation output of the output motor 16, and on the basis of an environmental condition and the like under which the apparatus is used.

And in the optical disk reproducing apparatus 1, a time counted by the built-in timer of the computing means 21 before an additional voltage is supplied in case that the mounting tray 3 does not start sliding even though the initial application voltage is supplied to the output motor 16 is 0.3 second, but this time can be properly set at request.

Further, the maximum application voltage to be supplied from the drive source 8 to the output motor 16 is 5.0 V, but it may be properly selected on the basis of the rotation output of the output motor 16 and the maximum speed required for sliding of the mounting tray 3.

Additionally, it is desirable that variation in voltage from the initial application voltage to be supplied to the output motor 16 or from a voltage at the start of the mounting tray 3, said voltage being made higher by being added every 0.3 second to 5.0 V and variation in voltage from 5.0 V to 1.8 V when the mounting tray 3 stops are properly set on the basis of the total time and the like required for sliding of the mounting tray 3.

In the optical disk reproducing apparatus 1, the measurement means 22 for detecting a distance (displacement) and a speed of sliding of the mounting tray 3 is composed mainly of the computing means 21, the timer, the rotating body 23 having the striped pattern extending in radial directions, and the optical sensor 24 for optically detecting rotation of the rotating body 23, but may be a combination or the like of a tachometer generator to operate by receiving a rotation output from the gear train 20 and a timer.

In the optical disk reproducing apparatus 1, the measurement means 22 has a composition in which the optical sensor 24 detects variation in brightness caused by rotation of the striped pattern of the rotating body 23, and a distance (displacement) of sliding of the mounting tray 3 and a speed of sliding at the displacement are obtained by the result of detection of the optical sensor 24 and by clocking of the timer, and the accuracy of measurement and control (correction) of a distance of sliding of the mounting tray 3 and a speed of sliding of it at this displacement can be determined by the density of stripes of the striped pattern of the rotating body 23 and the accuracy of clocking of the timer.

Figure 4:
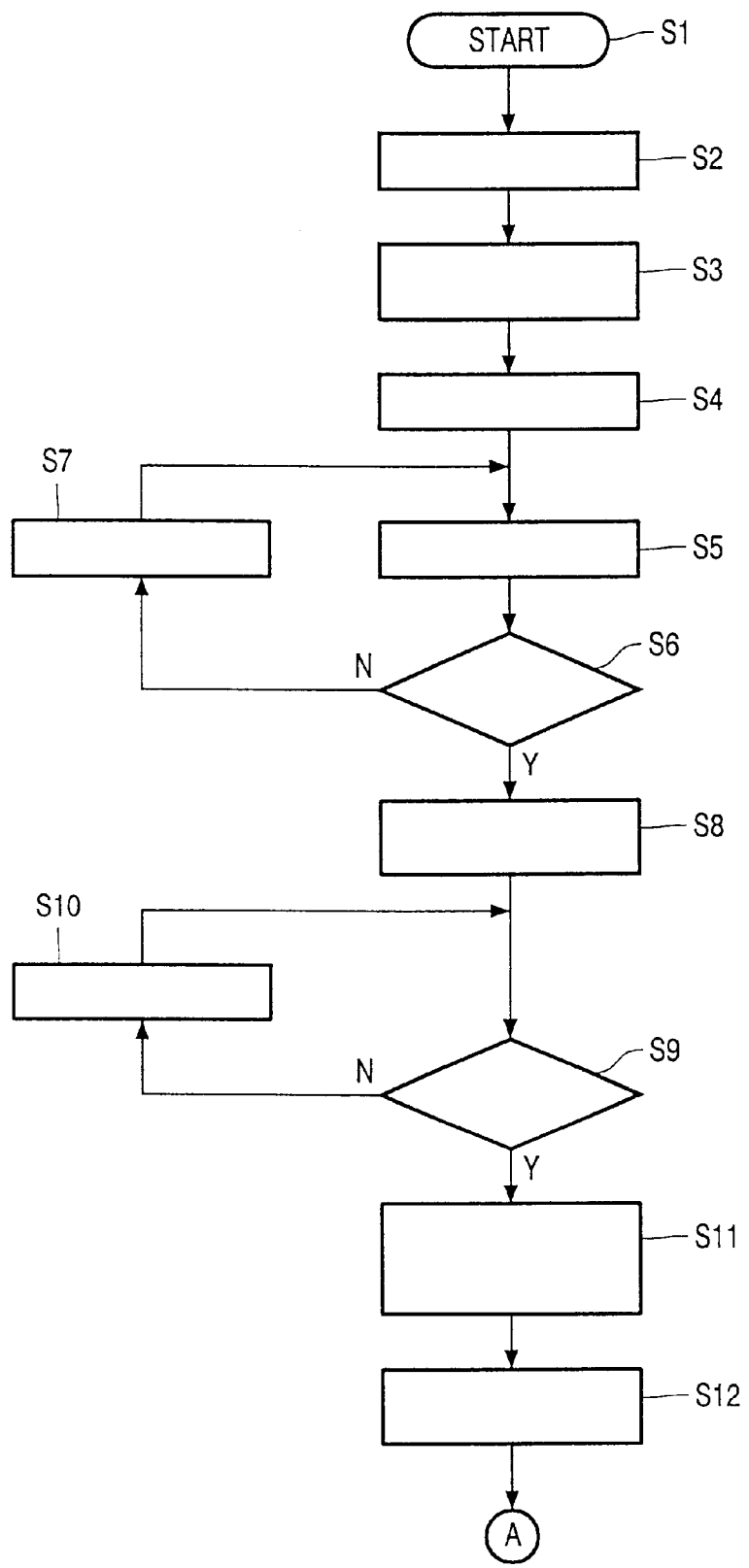
FIG. 4 is a flowchart for roughly explaining operation from the start to reproduction of an optical disk in the embodiment shown in FIG. 1.

In the optical disk reproducing apparatus 1, the rotating body 23 of the measurement means 22 is provided coaxially on a gear in the gear train 20 and it is desirable that the gear on which the rotating body 23 is coaxially provided is properly selected in consideration of other components and the like. The operation of the optical disc reproducing apparatus is illustrated in FIGS. 4 and 5. FIG. 4 shows steps 1–12, and FIG. 5 shows steps 13–23.

In FIG. 4 the steps 1–12 are defined as follows:

S1: START (Main power is turned on)

S2: User operates the operation part 11 so that the mounting tray 3 takes the projected position.

S3: Computing means 21 outputs an instruction signal to the drive source 8 so as to supply an initial application voltage to the output motor 16.

S4: Drive source 8 supplies the initial application voltage to the output motor 16.

S5: 0.3 second has passed after the drive source 8 supplied the initial application voltage to the output motor 16.

S6: Does the mounting tray 3 start sliding?

S7: Drive source 8 supplies a voltage higher by 0.2 V to the output motor 16.

S8: Drive source 8 supplies a series of continuous application voltages set and stored in advance in a memory to the output motor 16.

S9: Is the mounting tray 3 sliding at a speed as set?

S10: Control means 15 controls output of the drive means 14.

S11: Supply of an application voltage from the drive source 8 to the output motor 16 is stopped by operation of the limiter, and the mounting tray 3 stops sliding and takes the projected position relative to the apparatus main body 2.

S12: User places a desired optical disk on the mounting tray 3 and operates the operation part 11 to reproduce the placed optical disk.

Figure 5:
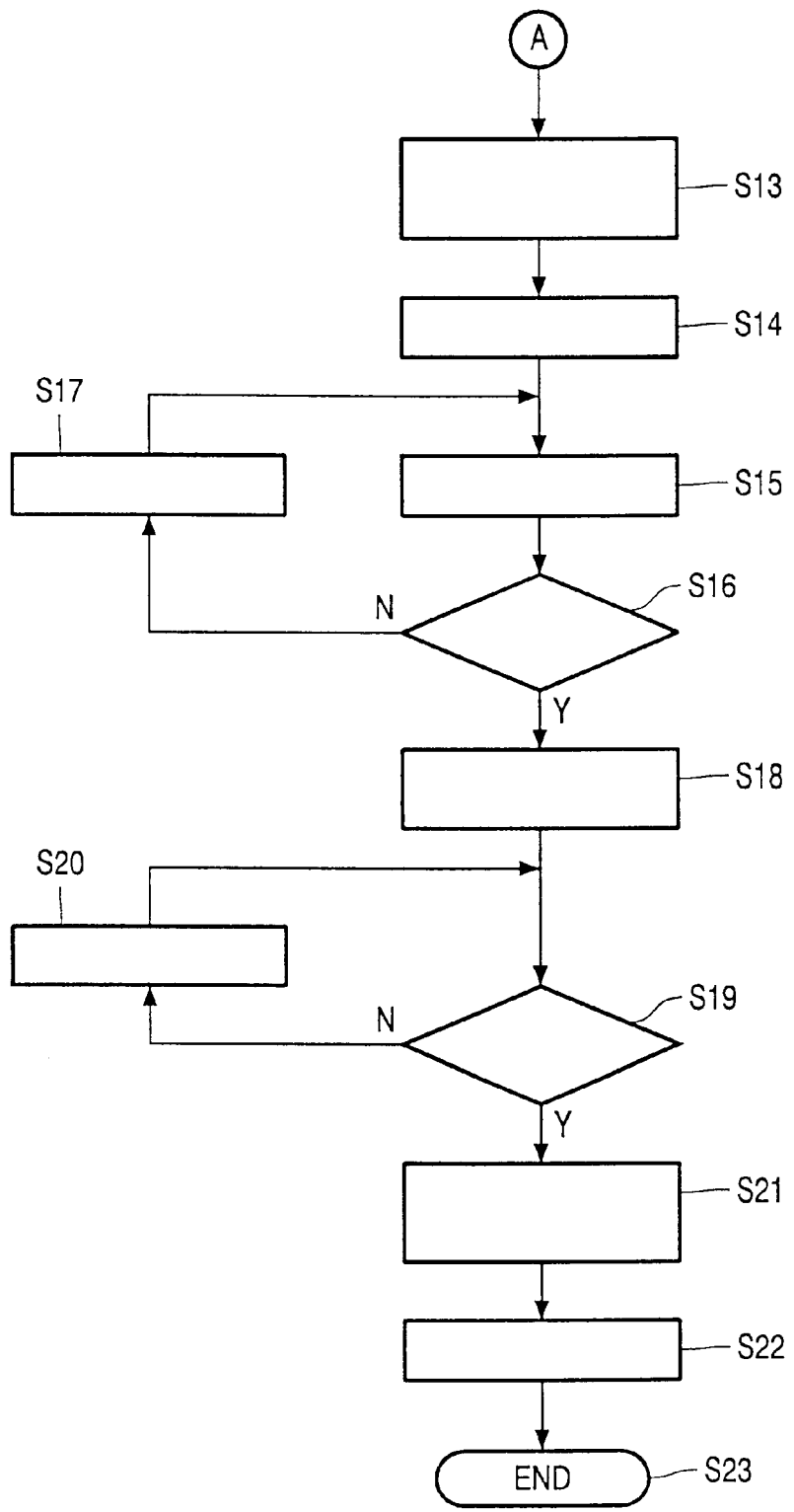
FIG. 5 is a flowchart for roughly explaining operation of the mounting tray from the projected position relative to the apparatus main body to the end of performance in the embodiment shown in FIG. 1.

In FIG. 5 the steps 13–23 are defined as follows:

S13: Computing means 21 outputs an instruction signal to the drive source 8 so as to supply the initial application voltage to the output motor 16.

S14: Drive source 8 supplies the initial application voltage to the output motor 16.

S15: 0.3 second has passed after the drive source 8 supplied the initial application voltage to the output motor 16.

S16: Does the mounting tray 3 start sliding?

S17: Drive source 8 supplies a voltage higher by 0.2 V to the output motor 16.

S18: Drive source 8 supplies a series of continuous application voltages set and stored in advance in the memory to the output motor 16.

S19: Is the mounting tray 3 sliding at a speed as set?

S20: Control means 15 controls output of the drive means 14.

S21: Supply of an application voltage from the drive source 8 to the output motor 16 is stopped by operation of the limiter, and the mounting tray 3 stops sliding and takes the contained position relative to the apparatus main body 2.

S22: Pickup means 5 reproduces the optical disk.

S23: END (End of performance)

The present invention is an optical disk reproducing apparatus, thanks to having a composition in which at a series of continuous speeds of slide when a mounting tray slides relative to an apparatus main body and under a certain condition being an environmental condition under which the apparatus is ordinarily most frequently used, a series of continuous application voltages to be supplied by a drive source to an output motor for sliding the mounting tray at said series of continuous speeds are set and stored in advance, and in which composition in case that said set speeds cannot be obtained when sliding the mounting tray by actually making the output motor output rotation, application voltages from the drive source are properly converted, even though a load imposed on the mounting tray is changed by the influence of an environmental condition such as temperature, humidity and the like of a space in which the apparatus is used, which optical disk reproducing apparatus can change rotation output from the output motor to the mounting tray correspondingly to the change of the load and as a result, can slide the mounting tray at a series of desirable continuous speeds as set relative to the apparatus main body, can keep the total time required for sliding of the mounting tray nearly constant and stable, and can secure the time required for sliding of the mounting tray as desired.

Particularly, an optical disk reproducing apparatus of the present invention has obtained an effect that it is possible to slide a mounting tray at a low speed when the mounting tray starts and stops sliding and as a result, keep an optical disk placed on the mounting tray in a stable state without imposing a large inertia force on the optical disk placed on the mounting tray at the start and the stop of sliding.

What is claimed is:

1. An optical disk reproducing apparatus comprising: an apparatus main body including pickup means for picking up recorded information from an optical disk; a mounting tray on which the optical disk is mounted; and slide means for sliding the mounting tray at varying speeds to a projected position for placement and discharge of the optical disk and a contained position for optical disk reproduction with respect to said apparatus main body, wherein said slide means has: an output motor and a drive source for supplying varying continuous application voltages to the output motor; drive means for supplying a driving force to said mounting tray to slide said tray with respect to said apparatus main body, and control means for previously storing a series of preset varying continuous speeds of slide with respect to said apparatus main body from slide start to slide stop upon slide of said mounting tray, and previously storing a series of preset varying continuous application voltages to be supplied from the drive source of said drive means to the output motor so as to obtain the preset-stored series of varying continuous speeds of slide, further, when said drive source supplies the preset-stored varying continuous application voltages to the output motor, to cause said drive means to output the driving force, so as to actually slide said mounting tray at varying speeds with respect to said apparatus main body, if said tray cannot slide at said preset varying continuous speeds, for controlling the application voltages from said drive source to said output motor so as to obtain the preset series of varying continuous speeds , and wherein a measurement means measures a slide speed of said tray with respect to said apparatus.

2. The optical disk reproducing apparatus according to claim 1, wherein the measurement means for measuring a slide speed of said tray with respect to said apparatus main body includes a timer, a rotating body, with stripes extending in a radial direction, which rotates based on a rotational force of the output motor, and an optical sensor which detects rotation of the stripes of the rotating body as a change in optical brightness/darkness.

3. The optical disk reproducing apparatus according to claim 1, wherein an initial application voltage to the output motor is less than a first application voltage to the output motor, and wherein a second application voltage to the output motor is less than the first application voltage to the output motor.

4. The optical disk reproducing apparatus according to claim 3, wherein a specified time interval exists between a change in application voltages to the output motor.

5. The optical disk reproducing apparatus according to claim 4, wherein the specified time interval is about 0.3 seconds.

6. The optical disk reproducing apparatus according to claim 3, wherein the initial, first, and second application voltages are in a range of about 1.8 volts to about 5.0 volts.

7. The optical disk reproducing apparatus according to claim 3, wherein additional application voltages are supplied to the output motor, and wherein each additional application voltage varies from a previous additional application voltage by about 0.2 volts.

8. The optical disk reproducing apparatus according to claim 2, wherein an initial application voltage to the output motor is less than a first application voltage to the output motor, and wherein a second application voltage to the output motor is less than the first application voltage to the output motor.

9. The optical disk reproducing apparatus according to claim 8, wherein the measurement means determines a change in the application voltages to the output motor which changes the speed of the output motor.

10. The optical disk reproducing apparatus according to claim 1, wherein the measurement means determines a change in the application voltages to the output motor which changes the speed of the output motor.

* * * * *